Figure 1:
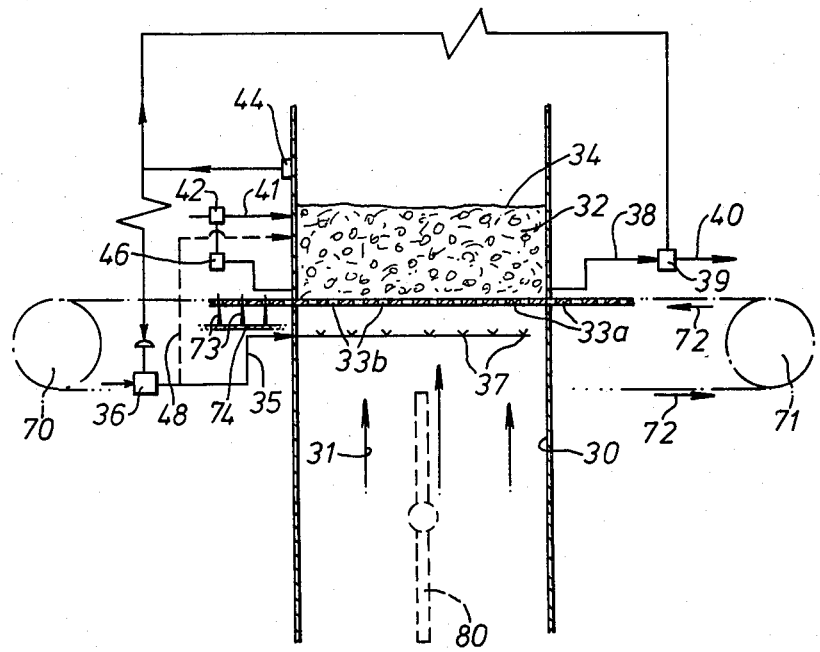

United States Patent [19]
Moss

[11] 4,222,749
[45] Sep. 16, 1980

[54] REMOVING PARTICLES FROM A PARTICLE-CONTAINING FLUID

[75] Inventor: Gerald Moss, Wantage, England

[73] Assignee: Exxon Research & Engineering Co., Florham Park, N.J.

[21] Appl. No.: 880,381

[22] Filed: Feb. 23, 1978

[30] Foreign Application Priority Data

Feb. 23, 1977 [GB] United Kingdom ............... 7604/77

[51] Int. Cl.² ..................... B01D 46/38; B01D 37/02
[52] U.S. Cl. ........................................ 55/18; 55/296;
55/340; 55/428; 55/466; 55/479; 55/524;
55/99; 423/DIG. 13; 423/DIG. 16; 422/144;
422/177
[58] Field of Search ............... 55/18, 77, 99, 270,
55/296, 340, 390, 428, 466, 474, 479, 524, 233;
23/288 S; 423/DIG. 13, DIG. 16; 34/57 A;
422/139, 177, 144; 427/213; 209/47, 49

[56] References Cited

U.S. PATENT DOCUMENTS

| | | | |
|---|---|---|---|
| 1,731,223 | 10/1929 | Brady | 55/474 |
| 2,503,291 | 4/1950 | Odell | 23/288 S |
| 2,586,818 | 2/1952 | Harms | 23/288 S |
| 2,650,084 | 8/1953 | White | 55/340 |
| 2,786,801 | 3/1957 | McKinley et al. | 23/288 S |
| 3,543,414 | 12/1970 | Gomarin | 34/57 A |
| 3,719,029 | 3/1973 | Suzukawa et al. | 55/233 |
| 3,847,094 | 11/1974 | Taeymans et al. | 55/99 |
| 3,849,899 | 11/1974 | Jenkinson | 23/288 S |
| 4,038,049 | 7/1977 | Melcher et al. | 55/466 |

FOREIGN PATENT DOCUMENTS

| | | | |
|---|---|---|---|
| 47-64507 | 1/1972 | Japan | 55/18 |
| 798502 | 7/1958 | United Kingdom | 423/DIG. 13 |

*Primary Examiner*—David L. Lacey
*Attorney, Agent, or Firm*—Reuben Miller

[57] ABSTRACT

Fines are removed from a fines-containing fluid by fluidizing a bed of fluidizable solids with the fines-containing fluid at conditions avoiding fluid spouting at the bed surface, the bed solids being preferably at least two orders of magnitude greater in size than the particles, and being coated with a substance whose stickiness changes during its residence time in the bed. Particles adhere to the transiently sticky solids and can be recovered for re-use. Useful for cleaning dusty gases and recovering catalyst from cracker flue gas.

8 Claims, 2 Drawing Figures

U.S. Patent    Sep. 16, 1980    4,222,749

REMOVING PARTICLES FROM A PARTICLE-CONTAINING FLUID

The present invention relates to removing particles from a fluid in which the particles are contained.

According to the present invention, in one aspect, a fluid containing particles is passed through a bed of particulate solids (hereinafter termed "solids" from time-to-time for brevity) which are fluidized under such conditions that substantially no fluid (e.g. gas) jets spout up from the top region of the bed, there being provided in the bed a conditioning agent which, under the conditions of operation of the bed, is sticky at one instant or period of time so as to cause particles to adhere to solids in the bed and which is less sticky or substantially non-sticky due to, e.g. physical and/or chemical changes therein, at another instant or period of time (which may be earlier or later than the said one instant or period) whereby the amount of particles in the fluid leaving the bed is less than the amount of particles in the fluid entering the bed at least during the time interval between the said one instant or period of time and the said other instant of period of time.

Preferably, the solids comprise solids which are considerably larger than at least some of the particles. For example, the solids may be about 2 orders of magnitude greater in size than the particles.

Conditioning agent may be added to the bed to maintain the "stickiness" of the bed solids for the particles at a required or desired level for particle removal. In addition of conditioning agent may be effected by passing conditioning agent directly into the bed and/or by passing conditioning agent associated with solids into the bed.

Preferably, solids are removed from the bed to avoid a build-up of agglomerates of solids and particles which might not, or do not, fluidize in the bed. The bed inventory may be maintained by adding thereto a compensating amount of make-up solids, and at least some of the make-up solids may have conditioning agent associated therewith.

The amount of conditioning agent in the bed should preferably not be so great that bed solids tend to adhere to each other to become non-fluidizable when the bed is fluidized and/or when the fluidization of the bed is started.

The conditioning agent may comprise or be a mixture of a solid material and a liquid. The solid material may be a solute and the liquid a solvent therefor (i.e. the mixture may comprise a solution).

The liquid may be separated from the solid material, e.g. by admixture (e.g. by evaporation) into the fluid or by chemical conversion, when subject to the bed operating conditions, leaving a progressively more concentrated solid material or substantially liquid-free solid material. The initial mixture may be sticky and the final concentrated solid material less sticky or substantially non-sticky. Alternatively, the initial mixture may not be sticky, but may become progressively stickier as liquid is lost from the mixture: the final, concentrated solid material may be substantially non-sticky. In another alternative, the initial mixture may not be sticky, but the substantially liquid-free solid material may be sticky.

The changes of stickiness may be occasioned not only by loss of liquid which is physically mixed with solid material (e.g. as a solution or suspension) but additionally and/or alternatively by the loss of liquid which is physically and/or chemically bound to the solid maerial (e.g. as in the case of hydrosols, gels, hydrates and the like).

Alternatively the conditioning agent or a part or component thereof may be modified under the bed operating conditions—e.g. by polymerization, oxidation or similar type of chemical change, pyrolysis, melting, formation of eutectics, chemical reaction with the particulate solid, or any combination of the foregoing.

Solids which are removed from the bed may be either dumped, or employed in another fluidized bed for another use, or for the purpose of removing particles from a fluid at different particle-removing conditions, or the solids may be so treated that at least some of them can be re-used in the fluidized bed from which they have been removed. For example, if the solids have particles adhered to them by a solvent-soluble substance which is, e.g. a component of the conditioning agent, the solids may be treated with the solvent and after separation from solvent and dissolved and/or dispersed particles, the solids may be returned to the fluidized bed. The solvent may be suitably treated so that it can be re-used as at least part of the conditioning agent for introduction into the fluidized bed if this is economically justified.

Among specific, non-limitative conditioning agents that may be employed are aqueous solutions of alkali metal silicates, sugars and solutions, dispersions and gels of starch: these conditioning agents become less sticky as water is evaporated. The liquid components of curable compositions such as paints, polymers and rubbery and non-rubbery resins may also be employed. The former group of conditioning agents have the advantage, for some applications, that the adhesion of particles to the solids may be broken simply by the action of water on the solids. The latter group of agents provide that the particles are less readily separated from the solids.

Another type of conditioning agent useful in high temperature particle removal operations is a low melting solid such as one, or a mixture of, alkali metal salts—e.g. the carbonates. These may, in many instances, enable the particles to be separated from the solids by leaching with water or dilute acid or other cheap chemical.

A further type of conditioning agent which may be employed is a carbonizable hydrocarbon or other organic compound which forms a tarry substance when heated. Particles adhered to the solids by tar which, on further heating, is converted to carbon, may be separated from the solids, at least in part, by subjecting the carbon-containing agglomerates of solids and particles to oxidation to remove at least some of the carbon.

Clearly, the foregoing types of conditioning agent do not constitute an exhaustive list of all possible conditioning agents.

The invention, in another aspect, comprises apparatus for removing particles from a fluid comprising a distributor for supporting a bed of fluidized particulate solids, a lateral wall laterally bounding the volume for the bed, a duct for passing particles-containing fluid to the distributor for passage into the volume of the bed of fluidizable solids whereby to fluidize said solids (when in said bed volume) without spouting, means for monitoring the amount of particles in fluid leaving the top of the bed volume, means for transferring solids out of the bed volume, means for transferring make-up solids into the bed volume substantially to maintain the inventory of particulate solids in the bed, and means for furnishing a conditioning agent to the bed volume.

Preferably means are provided for removing deposits from the distributor. Such means may be bristles, scrapers, knife edges or nibs disposed at a convenient position and operable either continuously or when needed.

The apparatus may comprise means for regulating the rate of fluid flow below the rate at which spouting will occur in the bed during operation.

The invention also comprises, in a further aspect, the combination comprising an industrial plant (e.g. a fossil-fuel combustion plant or a hydrocarbon or chemical process plant) which produces a gas and/or vapor containing entrained particles of a substance used, employed or produced during the operation of the plant and apparatus as described above, wherein the said duct is disposed and/or arranged for conducting the gas and/or vapor containing entrained particles to the said distributor. The particles may be, e.g., ash or catalyst fines.

During the correct use of the method or apparatus of the invention, the fluidized bed attains a steady state of stickiness for particles due, e.g., to the decay of stickiness of the conditioning agent, and/or e.g. as particles adhere to solids coated therewith. At the steady state conditions, the stickiness should be such as to avoid defluidization of bed solids but sufficient to cause at least a desired degree of particles removal from the fluid.

The bed solids should preferably be of a size that can at least be retained by suitable conventional solids-trapping equipment such as cyclones, and should preferably be relatively coarse in relation to the particles which are to be removed from the particles-containing fluid so that the latter can be passed through the bed at a relatively high superficial velocity. It has been noted that, within limits, high fluid velocities favor the removal of particles from the fluid.

The amount of conditioning agent to be used can easily be determined by simple experiments, and will depend on the nature thereof and the operating conditions. The amount will preferably be small (e.g. 1 to 10 wt.%) in relation to the weight of particles removed.

Figure 2:
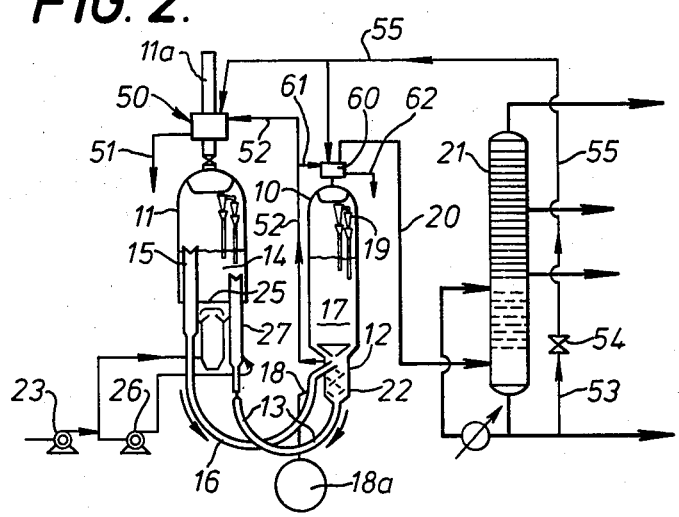

Embodiments of the invention, given by way of non-limitative examples only, are now described with reference to the accompanying drawings, in which:

FIG. 1 is a schematic cross-sectional elevation of apparatus for performing the invention showing, for the sake of simplicity, only the principal features thereof which are material to the present invention, and FIG. 2 shows, schematically, the principal features of a fluidized catalytic cracking ("FCC") plant incorporating the invention.

In the Figures, the various parts are not necessarily to scale relative to each other.

Referring first to FIG. 1, a gas in which fine particles ("fines") are suspended, is passed upwardly in duct 30 as indicated by arrows 31 into a fluidized bed 32 of particulate solids ("solids") which are preferably chosen to have an average size about two orders (i.e. ca.$10^2$) of magnitude greater than the average size of the fines, or greater.

The fines-containing gas is passed into the bed via a distributor 33 and the dimensions of the bed and the solids therein are so chosen in relation to the maximum design or expected gas flow rate that the upward passage of the gas there-through fluidizes the solids relatively vigorously but substantially without upward spouting of gas jets from the top 34 of the bed. If necessary, or desirable, there may be provided means for maintaining the gas flow rate below the rate at which such spouting tends to commence. The means may be a valve (e.g. a butterfly valve 80) of known type either upstream (as shown) or downstream of the bed 32. The gas flow rate may be detected in any known way (e.g. orifice plate, pitot tube) and the rate thus detected employed to operate the valve in the desired fashion. If the average size of the solids in the bed 32 is about 500 microns, the superficial upward velocity of gas may be from 0.8 to 1.0 meters/sec., although lower velocities may be employed.

A liquid conditioning agent, supplied via line 35 under the control of a valve 36 is sprayed into the gas passing to the bed via a number of nozzles 37. The conditioning agent is selected to change its physical and/or chemical state at least when in the bed 32 (e.g. when subjected to the conditions in the bed 32 which may include an elevated temperature substantially equal to the gas temperature). The conditioning agent enters the bed with the gas and coats solids in the bed 32. When the conditioning agent has so changed its state that it is sticky, it promotes adhesion between fines and the bed solids, so that the gas leaving the bed contains less fines than the gas entering the bed.

As fines accumulate in the bed 32, it is desirable to remove solids therefrom to avoid "saturating" the bed with fines and also to avoid the formation of agglomerates of fines and solids which might affect the fluidization of the bed. Solids are removed from the bed 32 via line 38 under the control of a regulator 39, and discarded either permanently or temporarily from the illustrated apparatus via line 40.

In order to maintain the bed inventory of solids, fresh solids are passed into the bed from line 41 under the control of a feeder 42.

While the distributor 33 may be of any conventional design, it is preferably so constructed and arranged that any tendency to blockage is minimized. This preferred objective may be achieved by mounting the distributor for horizontal movement out of the duct 30 via suitable sleeves (not shown) of any type known in the art so that it can be cleaned outside the duct. The distributor 33 in this type of embodiment may be formed of linked elements, such as (for example) elements of the type employed in chaingrate stokers of known construction, adjacent elements 33a defining slots 33b for the passage of the particles-containing gas upwardly therethrough into the bed 32. The distributor may be in the form of an endless belt (of which only part is depicted in FIG. 1) which passes around suitable driving and tensioning wheels 70, 71 in the direction indicated by the arrows 72. The cleaning may be effected by suitable mechanical and/or physical cleaning devices.

Suitable cleaning devices are shown in FIG. 1, and they comprise resilient bristles 73 (e.g. of steel wire or a suitable plastics material, such as polypropylene) extending upwardly from a mounting 74 so that the bristles 73 contact and scrape the underside of the belt 33 outside the duct 30 and, when in register with the slots 33b between the elements 33a of the belt, extend at least partially into the slots and exert a scraping and brushing action to remove deposits from the slots 33b. The mounting 74 is driven by driving means (not shown) of any suitable type known in the art so that at least the illustrated part of the mounting 74 and the bristles 73 thereon move relative to the belt 33 (i.e., perpendicularly to the plane of the paper). The movement may be a relatively slow reciprocating motion or, when the illustrated part of the mounting 74 is the top part of a cylindrical body (e.g., a drum or wheel on which the bristles 73 are radially disposed) or an endless belt, the movement may be continuous in one direction only as the cylindrical body or belt is driven in a constant direction or sense.

Alternatively, the distributor 33 may comprise a succession of parallel, circumferentially grooved rollers, the surfaces of adjacent rollers being contiguous with, or substantially touching each other, the rollers rotating about their axes and the grooves defining the gas-distribution orifices between the contiguous or touching surfaces of adjacent rollers. There may be provided suitable devices on the rollers themselves or on separate mounting means for removing deposits from the grooves as the rollers rotate. A distributor of this type is described in my co-pending U.S. patent application Ser. No. 833,672 filed Sept. 15, 1977 (which is a continuation of U.S. application Ser. No. 679,179 filed Apr. 22, 1976, now abandoned), inter alia, the disclosure of any one of which is hereby incorporated in the present patent specification.

In another preferred embodiment, the distributor 33 is formed from flexible steel strip having suitable perforations therethrough. Conveniently, the perforations are slits extending lengthwise of the strip. Slitted perforated steel strip belts are commercially available and used in industry. The removal of deposits from this type of distributor may be effected in much the same way as described with reference to the other embodiments; in one convenient arrangement, the bristles 73 are mounted on, and extend radially outwards from, a drum (e.g. part 74 as depicted in FIG. 1) and the drum is rotated about an axis perpendicular to the length of the belt 33 and the slits therein to provide an effective deposit-removing action. The drum may be rotated in any direction which provides relative movement between the bristles 73 and the belt or distributor 33.

In order to maintain a substantially continuous level of fines removal, the gas leaving the top of the bed 32 is monitored for fines by any suitable monitoring device 44, such as an opacity meter. Signals from the device 44 may be employed to regulate the setting of valve 36 to regulate the amount of conditioning agent sprayed from nozzles 37, the amount being increased when the device 44 detects an increased amount of fines in the treated gas. The signals from the device 44 may also be employed to regulate the removal of bed solids and the supply of make-up solids. As shown in FIG. 1, signals from the device 44 are transmitted to the regulator 39 whereby an increased amount of fines detected in the treated gas results in the removal via line 38 of an increased amount of solids. A bed pressure cell 46 monitors the weight of solids in the bed 32 and transmits suitable signals to feeder 42 to transfer fresh solids to the bed 32 when the bed inventory falls. Instead of the device 44 influencing regulator 39, it may be connected for influencing feeder 42, the regulator 39 then being operated in accordance with signals from the bed pressure cell 46.

As an alternative or in addition to the foregoing, the conditioning agent may be supplied directly into the bed 32 via line 48. This would be advantageous in those instances where conditioning agent might tend to cause undesirable amounts of fines to adhere to the underside of the distributor 33. The conditioning agent may, as an alternative or in addition to any one of the foregoing, also be provided in admixture with the make-up solids applied via line 41.

The conditions of operation of the bed 32 are such that the conditioning agent changes its state of stickiness within the bed 32. Thus, if the gas in duct 30 is a flue gas passing to the stack of an industrial plant before and/or after contact with heat recovery equipment, the conditioning agent may be a solution or dispersion of sugar and/or starch which, at the elevated temperature in the bed 32 heated by the flue gas, becomes progressively stickier as water is evaporated, thereby causing adhesion of fines when impacting againts solids in the bed 32. With sugar solutions, a maximum stickiness occurs when the evaporation of water leaves a syrupy residue. Thereafter, stickiness declines unless, when substantially all the water has evaporated, the bed temperature is so high that the sugar is caramelized, becoming sticky until it is converted to a char. Any fines adhered during the sticky state of the conditioning agent tend to remain adhered even after the conditioning agent has become non-sticky.

In some operations, bed material having a suitable conditioning agent thereon may be readily available.

Reference is now made to FIG. 2, wherein cracker feed oil is supplied via line 18 from source 18a to a riser 16 containing hot regenerated catalyst recovered via overflow well 15 in a dense phase regeneration bed 14 above an air distributor 25 of a regenerator vessel 11. The mixture of catalyst and oil (liquid and vapor) is passed to a dense phase bed 17 of catalyst contained in a cracker vessel 10 wherein it is converted to cracked products in the vapor phase. The vapors, together with entrained catalyst fines, pass via a cyclone system 19 to a recovery line 20 for separation into cracked fractions in a distillation tower 21. Catalyst containing coke, tar and occluded hydrocarbons, is removed from the cracker vessel 10 via a stripping zone 12 countercurrently to steam passed thereinto at 22, and the stripped coke-containing catalyst is circulated via conduit 13 and riser 27 to the dense phase regeneration bed 14. Air is injected into riser 27 from an auxiliary air blower 26 to commence the oxidation of coke from the catalyst and the oxidative-regeneration is continued in the bed 14 employing air from a main air blower 23. Flue gas and entrained catalyst fines leave the regenerator vessel 11 via a cyclone system and pass to a stack 11a. The FCC plant as thus so far described is conventional.

The flue gases leaving the regenerator vessel contain entrained catalyst fines, and although efforts to prevent the discharge of these fines to atmosphere have been made with a view to reducing atmospheric pollution, and, to a more limited extent, to recover the fines for re-use, considerable amounts of catalyst fines are lost in the regenerator flue gas. The lost catalyst has to be replaced in the FCC plant, and may be relatively costly. Moreover, the catalyst fines are often more active for hydrocarbon conversion than the larger catalyst particles.

As will be seen from FIG. 2, a fines recovery system is provided to reduce atmospheric pollution and to increase the recovery of the catalyst fines. The system comprises a vessel 50 mounted, e.g. above the regenerator vessel 11 for receiving flue gas passing to the stack. The vessel 50 is provided with at least one distributor (not shown) as described with reference to FIG. 1. with a bed of relatively coarse catalyst solids thereon fluidized by the upwardly passing flue gas. A conditioning agent is furnished in the vessel so that catalyst fines stick to the coarser bed particles. A "bleed" of coarse bed particles prevents "saturation" of the bed with fines, the bleed being returned to the regenerator 11 vessel and/or the cracker vessel 10 (either directly or indirectly) via line 51 (corresponding to line 40 of FIG. 1) and/or recovered for reprocessing. A make-up of coarse catalyst particles is furnished via line 52 from the base of the dense phase of the cracking bed 17 above the stripping zone 12. The particles from this region tend to be sticky due to the accumulation of tarry products thereon and catalyst fines stick thereto. The temperature of the regenerator flue gas is high enough to carbonize the hydrocarbons and tarry products on the catalyst particles to a non-sticky state in the residence time of the particles in the vessel 50 so that the particles recovered via line 51 have fines adhered thereto with a certain amount of carbonaceous material also prevent.

If the catalyst particles from the cracker vessel 10 are insufficiently sticky, an additional conditioning agent may be introduced into the fluidized bed in the vessel 50. A suitable conditioning agent is a heavy, preferably low-value, cracked product recovered from the distillation tower 21. As shown, the heavy product may comprise a cycle oil and/or a heavy oil containing catalyst fines from the cracker ("slurry oil") and/or a cracked bottoms, supplied via line 53, valve 54 and line 55. The heavy product may be introduced into the fluidized bed in vessel 50 either by spraying (e.g. as described in relation to FIG. 1) or by contacting the catalyst particles in or from line 52. If slurry oil is employed as the additional conditioning agent, the catalyst fines therein will adhere to coarser catalyst particles in the fluidized bed and will be recovered with the bleed of catalyst particles in line 51.

Referring now to the cracker vessel 10, fines which are carried out of the vessel with cracked products leaving the cyclone system may also be recovered, at least to some extent, by providing a shallow fluidized bed of sticky, coarse catalyst particles in a vessel 60 which may, conveniently, be mounted above the vessel 10. The sticky, coarse particles may be unstripped particles from the base of the cracking zone 17 which are conveyed via line 52 and 61 to the bed in the vessel 60. If the coarse particles are insufficiently sticky, a conditioning agent, such as the heavy hydrocarbon stream in line 55, may be introduced to the bed in vessel 60. Fine particles adhere to the coarser catalyst particles and both are recovered via line 62 for return to the cracking bed and/or to the regenerator bed (either directly or indirectly), and/or recovered for reprocessing. The amount of fines carryover to the distillation tower 21 is reduced, and the amount of slurry oil for filtration and clarification is also reduced.

The fines-trapping beds need not be in the positions shown in FIG. 2. For example, flue gas from the regenerator may be passed through heat recovery equipment (and/or a CO-burning boiler), and the bed for trapping fines may be located at any convenient position between the regenerator vessel 11 and the top of the stack.

Although the invention has been particularly described in relation to catalytic cracking, it is not limited thereto, and may be employed for trapping fines in fluids emanating from other fines-generating or liberating processes.

I claim:

1. A method of removing particles from a fluid in which the particles are contained which comprises passing the particles-containing fluid upwardly through a bed of fluidizable solids containing a conditioning agent under such conditions that substantially no fluid jets spout up from the top region of the bed, the said conditioning agent being selected so as to have the property of imparting to the fluidizable solids of the bed, under the normal conditions of operation thereof, a relatively high degree of stickiness at one instant or period of time and a lower degree or substantial absence of stickiness at another instant or period of time due to physical and/or chemical changes in the said conditioning agent under the bed operating conditions so that particles adhere to said solids in the bed at said one instant or period of time, whereby the amount of said particles in the said fluid leaving the said bed is less than the amount of said particles in said fluid entering the said bed at least during the time interval between the said one instant or period of time and the said another instant or period of time.

2. A method according to claim 1 wherein the said bed contains solids which are about 2 orders of magnitude greater in size than the said particles.

3. A method according to claim 1 wherein at least a component of the said conditioning agent is chemically and/or physically modified under the said bed operating conditions.

4. A method according to claim 1 wherein the said fluid is a flue gas and/or vapor produced during the conversion of hydrocarbon or chemical feedstocks in a fluidized bed of catalyst, the said particles comprise catalyst fines entrained in the said fluid, and the said conditioning agent is a carbonizable material which is a tarry substance or is converted to a tarry substance when subjected to the said operating conditions in the bed.

5. A method according to claim 4 wherein the said solids of the said bed comprise catalyst solids used in the said catalytic conversion.

6. A method according to claim 1 wherein solids are discharged from the said bed to avoid defluidization of at least some solids in the said bed, additional solids are added to the said bed to maintain a substantially constant amount of solids in the bed, and the discharged solids are either dumped or treated for recovery of adhered particles and/or recovery of solids substantially free of adhered particles.

7. A method according to claim 1 wherein the degree of stickiness of said bed solids for said particles is maintained at a required or desired level for removal of said particles by the addition of said conditioning agent to said bed.

8. A method according to claim 1 wherein the said conditioning agent comprises a mixture of solid material and liquid, which liquid becomes at least partly separated from the said mixture at the said bed operation conditions.

* * * * *